(12) United States Patent
Hewson

(10) Patent No.: US 8,002,229 B2
(45) Date of Patent: Aug. 23, 2011

(54) SUPPORT DEVICE

(75) Inventor: Peter Hewson, Leeds (GB)

(73) Assignees: David Michael Brine, Howden (GB); Peter Gareth Hewson, Bradford (GB)

( * ) Notice: Subject to any disclaimer, the term of this patent is extended or adjusted under 35 U.S.C. 154(b) by 1133 days.

(21) Appl. No.: 11/749,485

(22) Filed: May 16, 2007

(65) Prior Publication Data

US 2008/0099651 A1 May 1, 2008

(30) Foreign Application Priority Data

Nov. 1, 2006 (GB) .................................... 0621718.6
Feb. 9, 2007 (GB) .................................... 0702539.8

(51) Int. Cl.
*F16M 13/00* (2006.01)
(52) U.S. Cl. ...................... 248/410; 248/161; 248/354.1; 248/411
(58) Field of Classification Search .............. 403/109.5, 403/377, FOR. 100; 248/351, 410, 411, 248/161, 354.1, 354.6, 412, 414
See application file for complete search history.

(56) References Cited

U.S. PATENT DOCUMENTS

| 270,012 | A | * | 1/1883 | Burruss ......................... 254/106 |
| 1,845,143 | A | * | 2/1932 | Friesner ........................ 403/105 |
| 3,522,658 | A | * | 8/1970 | Howell .......................... 33/528 |
| 3,734,441 | A | * | 5/1973 | Lux .............................. 248/354.1 |
| 3,883,106 | A | * | 5/1975 | Simonsen ..................... 254/106 |
| 2007/0196196 | A1 | * | 8/2007 | Schorling et al. ............. 411/555 |

* cited by examiner

*Primary Examiner* — Amy J Sterling
(74) *Attorney, Agent, or Firm* — Woodard Emhardt Moriarty McNett & Henry

(57) ABSTRACT

A support device is provided including first and second telescopic members, the distal end or ends of the members engaging with a suitable surface in use. Locking means are provided on the first and/or second members to lock the members in a required relative position. The locking means includes a locking portion movably mounted on the first and/or second members and actuating means. The actuating means move the locking portion between a first unlocked position, wherein the locking portion is movable relative to the first and/or second members, and a second locked position, wherein the locking portion engages with the first and/or second members to lock the members in the required relative position.

32 Claims, 7 Drawing Sheets

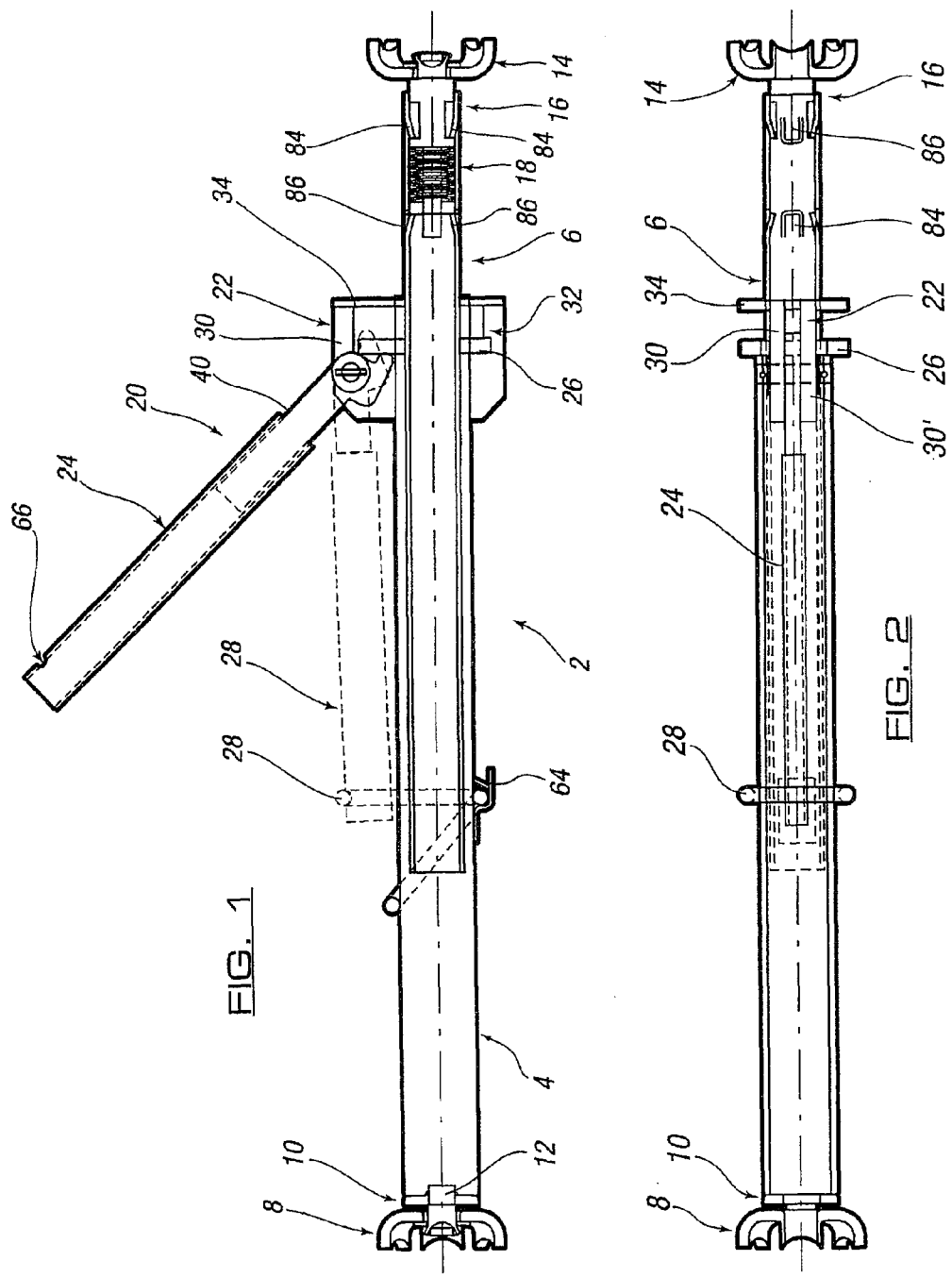

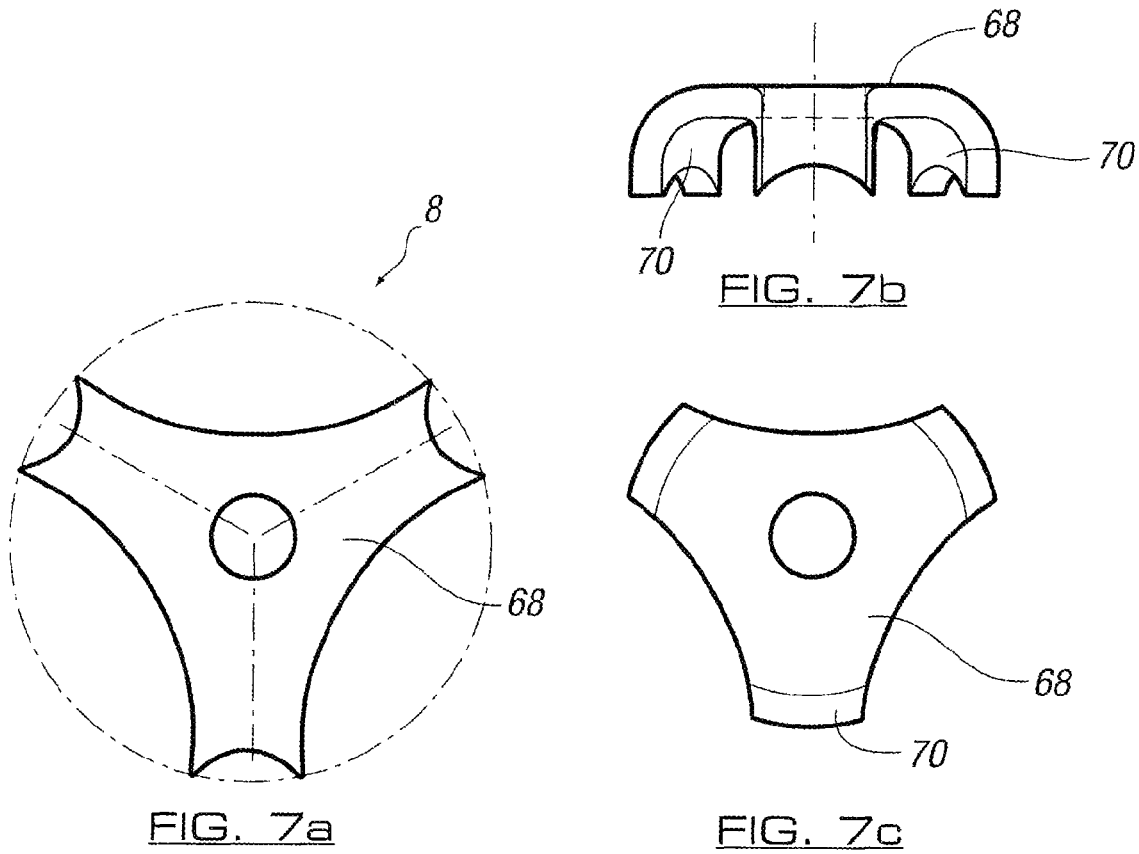
FIG. 7b
FIG. 7a
FIG. 7c
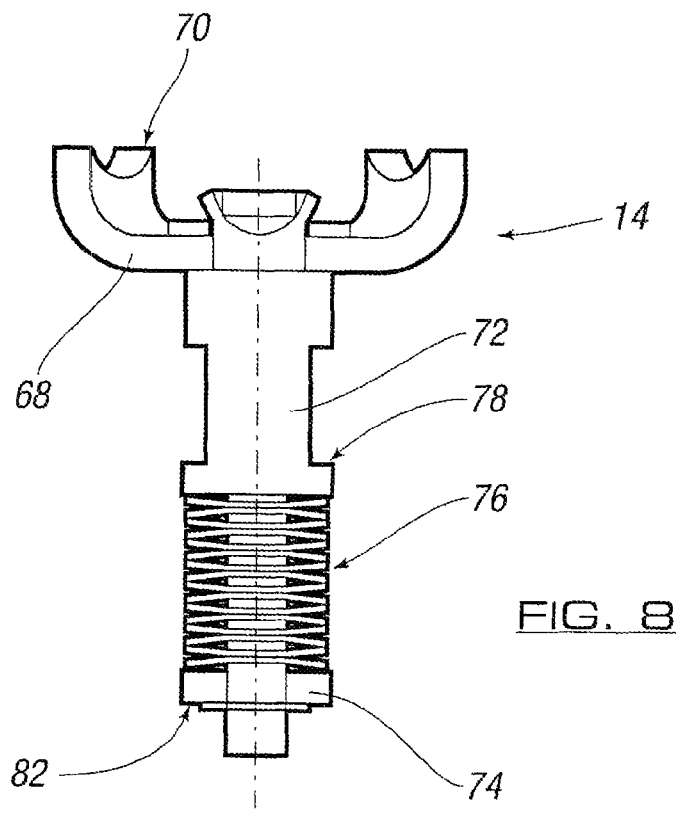
FIG. 8

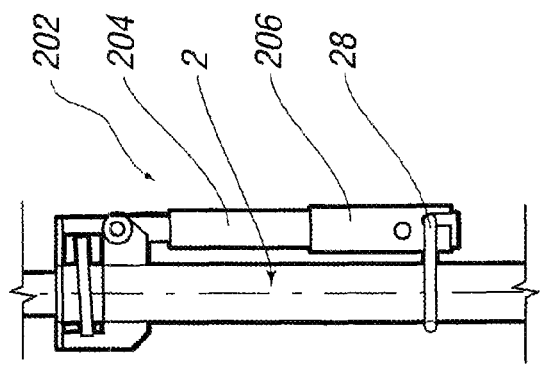
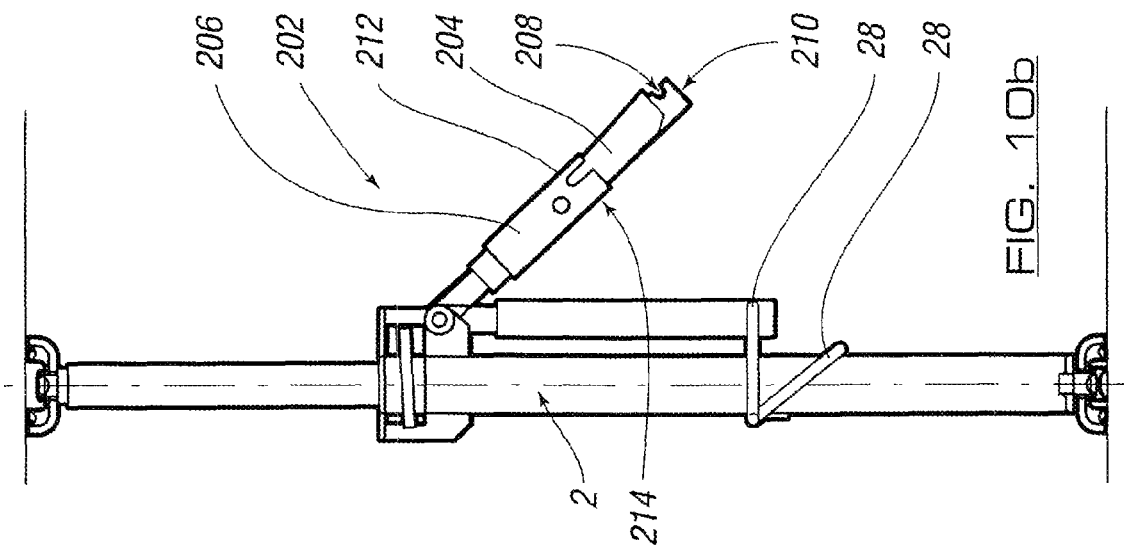
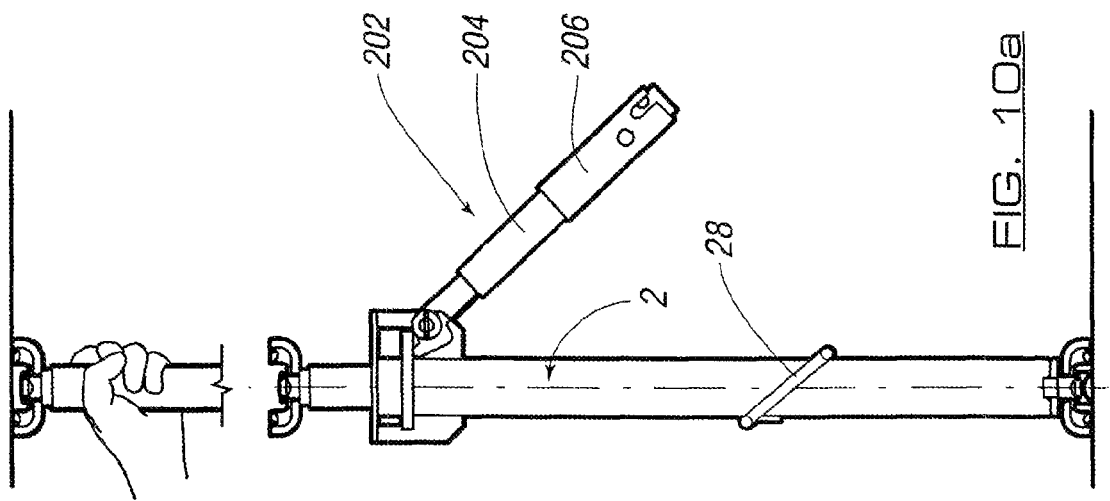

SUPPORT DEVICE

This invention relates to a support device and method of use thereof.

Although the following description refers almost exclusively to a support device of a type for use with a safety fence assembly or edge protection system in the construction industry, it will be appreciated by persons skilled in the art that the present invention can be used alone and/or with any other items and can be used in any suitable application.

It is known to use safety posts, fences and barriers during the construction of buildings to prevent construction workers from falling from the building and injuring themselves. The safety posts are typically located between a floor and ceiling of a new construction and a safety fence or barrier is then fitted between adjacent, spaced apart safety posts to form a temporary safety wall.

Conventionally, safety posts have been fitted by drilling a hole in a floor of the building being constructed, bolting a foot support in the hole and attaching a first end of a post to the foot support and a second end to the ceiling at the same level of the building. A problem with this conventional approach is that holes need to be drilled in the floor and the foot support manually bolted to the floor, thereby making the posts and fence assemblies time consuming to fit, requiring special tools and may affect the strength and aesthetic finish of the construction.

In an attempt to overcome the abovementioned problem, it is known to provide a safety post which can be more easily detachably attached between a floor and ceiling of a building. An example of such a post is disclosed in WO2006/010270. The safety post includes telescoping inner and outer tubes. A floor engaging end is joined to the outer tube via a rotatable threaded shaft and a ceiling engaging end is rotatably coupled to the inner tube and includes a coiled compression spring arrangement. Both the ceiling and floor engaging ends have sharp penetrating points to ensure sufficient engagement between the ends and the surfaces with which they engage. The compression spring arrangement ensures that a biasing force is applied to the engaging ends sufficient to provide secure engagement of the post between the floor and ceiling. A gravity lock assembly is provided between the inner and outer tube to fix the relative positions of the inner and outer tubes in use.

It is an aim of the present invention to provide an alternative support device.

It is a further aim of the present invention to provide a method of using a support device.

According to a first aspect of the present invention there is provided a support device, said support device including at least first and second telescopic members, the distal end or ends of said first and/or second members engaging directly or indirectly with a suitable surface in use, and locking means being provided on said first and/or second members to lock the members in a required relative position in use, and wherein the locking means includes a locking portion movably mounted on said first and/or second members and actuating means, said actuating means moving said locking portion between a first unlocked position, wherein said locking portion is movable relative to the first and/or second members, and a second locked position, wherein said locking portion engages with the first, and/or second members to lock the members in said required relative position.

Preferably the locking portion is slidably movable longitudinally of the support device in the first unlocked position.

Preferably the locking portion has an aperture or recess defined therein and the first and/or second telescopic members are located through said aperture or recess and are movable relative thereto.

The locking portion can be in the form of a plate like component with an aperture or recess defined therethrough.

Preferably one or more inner edges or walls of the locking portion defining the aperture or recess are moved into engagement with the first and/or second telescopic member in the second locked position.

Preferably at least part of the actuating means is attached to one of said at least first or second telescopic members and the locking portion is movably mounted on the other of said telescopic members in the first unlocked position.

In a preferred embodiment the actuating means is attached to the outer or lower telescopic member and the locking portion is movably mounted on the inner or upper telescopic member in the first unlocked position.

The actuating means typically includes a bracket assembly to which an actuating handle portion is movably mounted. The actuating handle portion typically actuates movement of the locking portion between the locked and unlocked positions. Further preferably the handle portion is arranged so as to move the locking portion from a position where it is substantially transverse to the telescopic member on which it is mounted in the first unlocked position, to an acute angle to the telescopic member in the second locked position.

The handle portion can be provided with a cam or curved surface to move the locking portion to the angled position as required.

Preferably the bracket assembly includes stop means to limit movement of the locking portion on said first and/or second telescopic member.

In one embodiment the stop means includes a plate like member with an aperture defined therethrough which, in the first unlocked position, allows one of said first or second telescopic members to be movable therethrough but prevents movement of the locking portion therethrough.

In one example, the stop plate limits movement of the locking portion in one direction and the end of the telescopic member to which the bracket assembly is joined limits movement of the locking portion in a second or opposite direction. Thus, the cross sectional dimensions of the aperture or recess of the locking portion in one example are larger than the cross sectional dimensions of the inner member but are smaller than the cross sectional dimensions of the outer member.

Preferably the locking portion including at least one recess which is movably mounted on at least a part of the actuation means, and particularly said bracket assembly, thereby guiding movement of the locking portion relative to the actuation means or bracket assembly in use.

Preferably the first and second telescopic members are substantially elongate in form and are telescopic in the longitudinal axis of said members.

A further safety lock can be provided to lock the actuating means in the second locked position in use.

In one embodiment the further safety lock is required to be engaged with the actuating means in order for the locking portion to remain in a second locked position.

Preferably the further safety lock is in the form of a lever or annular member which is moved into engagement between the handle portion and one of the telescopic members.

Further preferably the further safety lock is pivotably mounted to one of the telescopic members.

Preferably the handle portion includes a safety recess or complementary safety engagement portion defined thereon for location with or engagement with a safety lock.

In one embodiment the handle portion includes at least first and second parts, the second part slidable relative to the first part. The second handle part is typically slidable between a first position, wherein the second handle part is a spaced distance from the safety recess or safety engagement portion to allow a safety lock to be engaged with and/or released from said safety recess or engagement portion, and a second position, wherein the second handle part is located over at least part of the safety recess or safety engagement portion to prevent engagement with or release of a safety lock with said safety recess or engagement portion.

Preferably the second part is in the form of a sleeve which is slidably mounted on the at least first handle part. A stop mechanism can be provided to limit sliding movement of the second part relative to the at least first handle part between required positions.

Preferably one or more apertures or recesses are provided in a side wall of the second handle part to allow a locking bolt, padlock and/or the like to be located through said aperture or apertures to maintain the second handle part in a required position (such as the first or second positions) relative to the first handle part.

Preferably a support foot is provided at the distal end or ends of the at least first and/or second telescopic members to engage with one or more suitable surfaces in use. The support foot can have one or more engaging means associated therewith to increase engagement between the support foot and the support surfaces. The engaging means can include one or more protruding spikes, teeth, gripping members and/or the like.

The support foot can be fixedly or movably joined to a distal end of the at least first and/or second telescopic members in use. For example, a support foot can be welded, bolted or integrally formed with an end of the telescopic member. Alternatively, the support foot can be rotatably mounted to the telescopic member via a screw thread, shaft and/or the like.

In one embodiment a support foot of the first and/or second telescopic member is associated with resilient biasing means for biasing the support foot outwardly of the telescopic member.

Preferably one or more inwardly protruding tabs are provided on the telescopic member to maintain the resilient biasing means in place in the telescopic member. Further preferably said tabs are integrally formed with the telescopic member, such as for example, in the form of one or more cut out portions bent inwardly of the telescopic member.

The resilient biasing means can include one or more springs, sprung metal or material and/or the like. In a preferred embodiment the resilient biasing means is in the form of one or more disc springs. The number of disc springs can be adjusted as required to allow a required level of resilient force to be applied to the support foot in use.

According to a second aspect of the present invention there is provided a support device, said support device including at least first and second telescopic members, a support foot associated with a distal of the first and/or second members to engage with a suitable surface in use, and resilient biasing means being associated with the support foot for biasing said support foot outwardly of the member or members, and wherein the resilient biasing means is in the form of one or more disc springs.

Preferably a stack, of disc springs are used. The disc springs are typically stacked inside the telescopic member and longitudinally thereof. Adjustment of the number of disc springs typically allows adjustment of the biasing force provided by said springs.

According to a further aspect of the present invention there is provided a support device, said support device including at least first and/or second members, the distal end or ends of said members engaging directly or indirectly with a suitable surface in use, and locking means being provided between said first and second members to lock the members in a required relative position, and wherein a further support member is associated with the support device, the further support member having a distal end engaging directly or indirectly with a suitable surface in use.

Preferably the further support member is in the form of an elongate post and a linkage assembly links the further support member to the first and/or second telescopic member. Further preferably the linkage assembly links the further support member to the telescopic member or members so as to be spaced apart therefrom but substantially aligned therewith in a longitudinal axis.

Preferably the linkage assembly includes a substantially C-shaped or G-shaped linkage.

According to a yet further aspect of the present invention there is provided a method of using a support device, said support device including at least first and second telescopic members and said method including the steps of engaging the distal end or ends of said first and/or second members directly or indirectly with a suitable surface, and locking the members in a required relative position using locking means provided on said first and/or second members, and wherein the locking means includes a locking portion movably mounted on said first and/or second members and actuating means, said actuating means moving said locking portion between a first unlocked position, wherein said locking portion is movable relative to the first and/or second members, and a second locked position, wherein said locking portion engages with the first and/or second members to lock the members in said required relative position.

According to a yet further aspect of the present invention there is provided user actuation means.

Due to the simplicity of construction of the support device of the present invention, the device is easy and inexpensive to manufacture and use. In addition, the device can he substantially entirely galvanised since there is no requirement for bolted or welded parts.

Embodiments of the present invention will now be described with reference to the accompanying figures, wherein:

FIG. 1 is a cross sectional view of a support post according to an embodiment of the present invention showing locked and unlocked positions;

FIG. 2 is a side view of the support post in FIG. 1;

Figure 3:
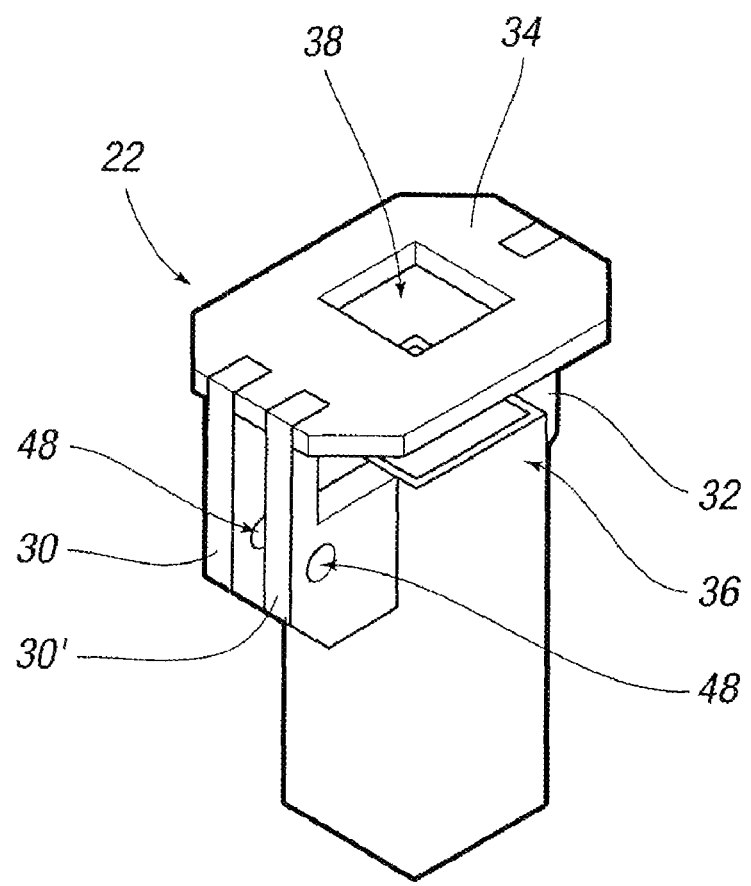
FIG. 3 is a detailed perspective view of the bracket assembly in FIG. 1.
Figure 4A:
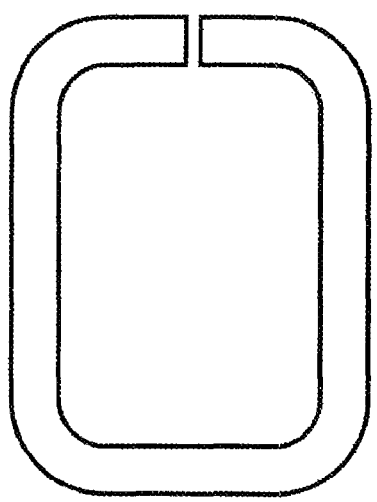
Figure 4B:
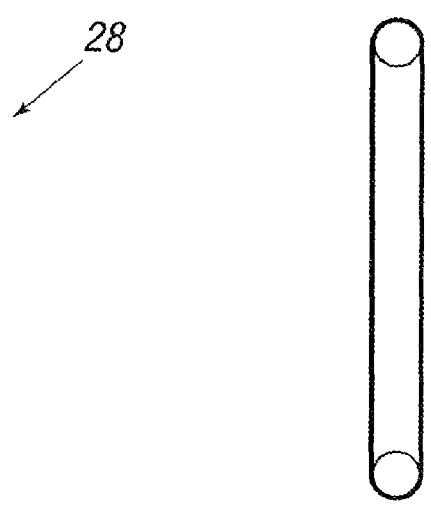
Figures 5A, 5B:
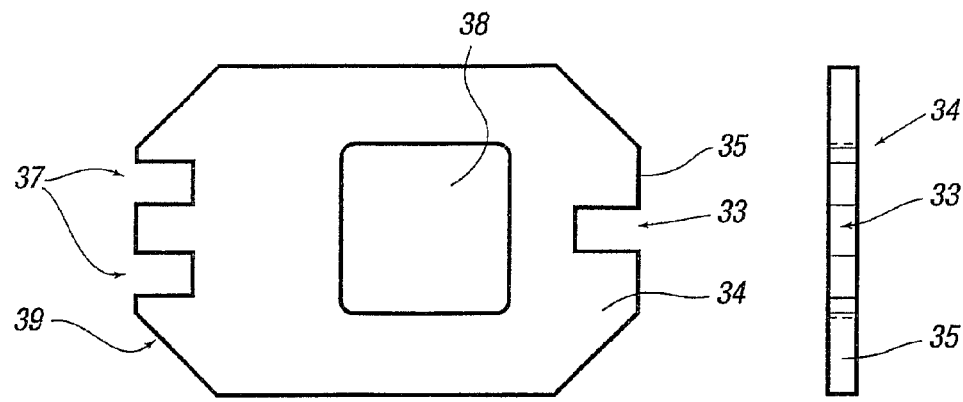
Figures 6A, 6B:
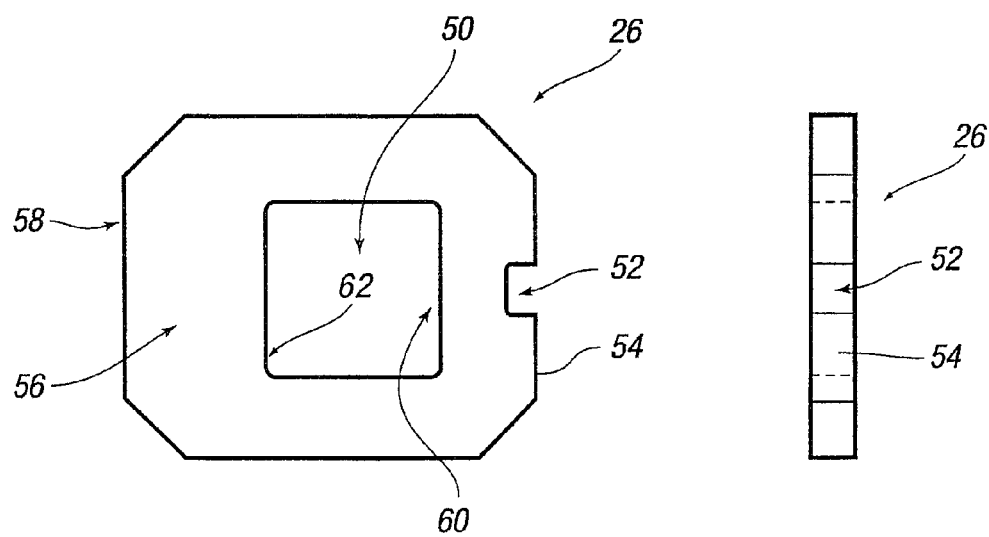
Figure 6E:
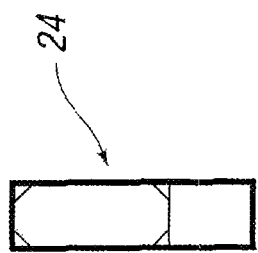
Figure 6C:
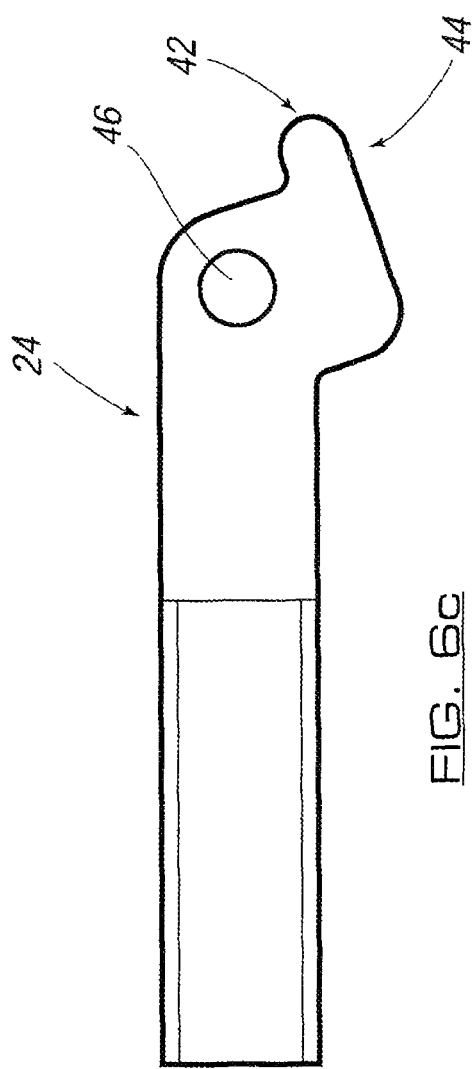
Figure 6D:
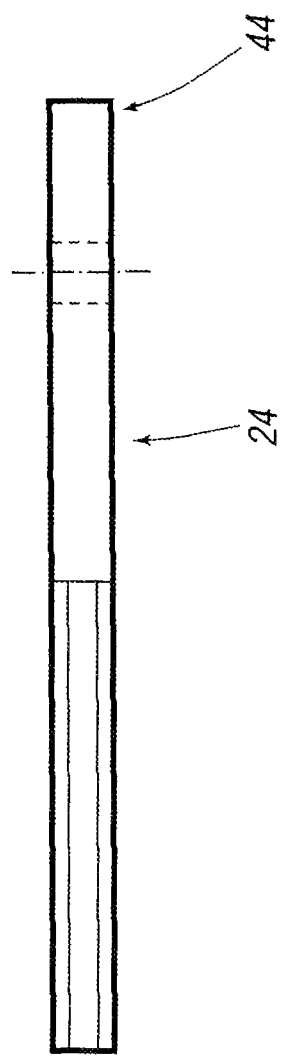
Figure 9:
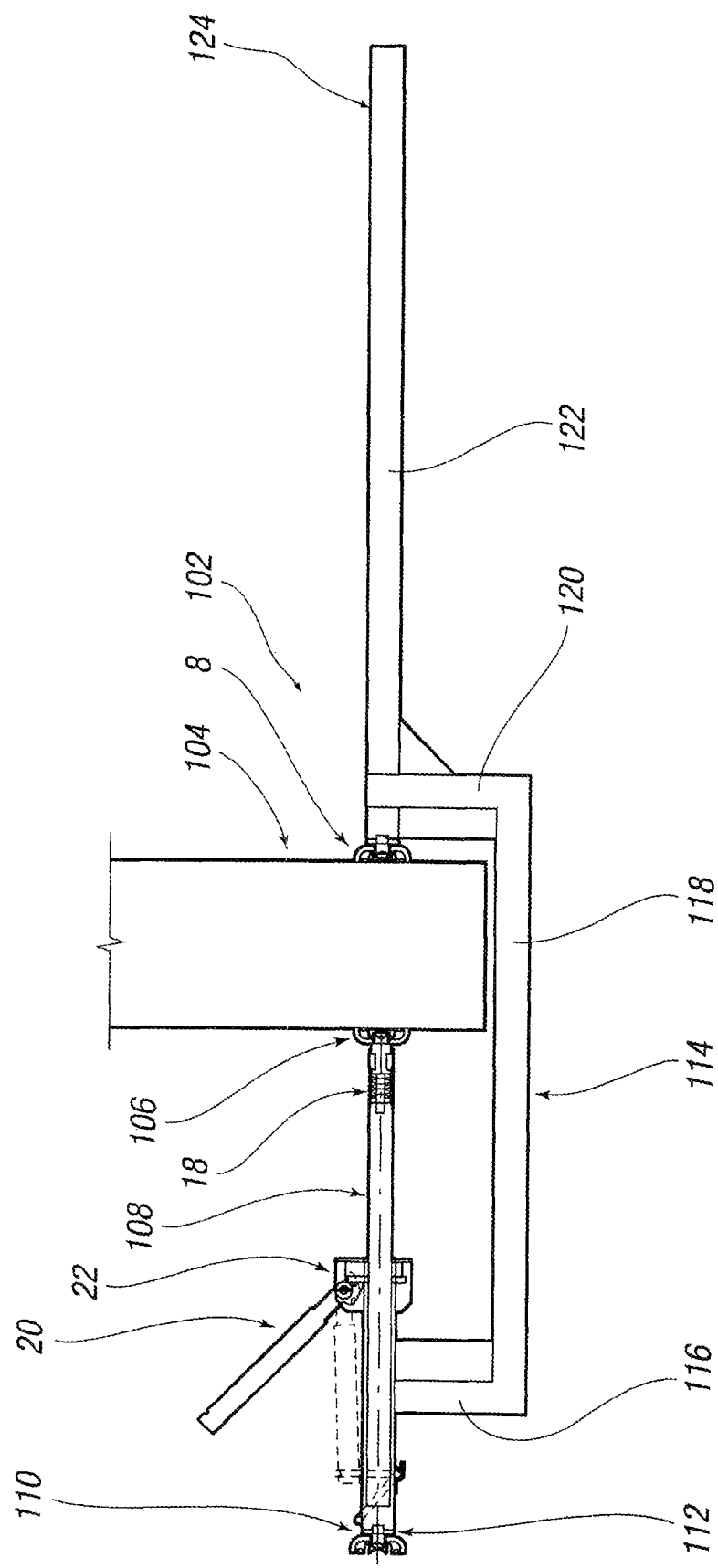

FIGS. 4*a* and 4*b* show a detailed plan view and side view of the locking ring in FIG. 1 respectively;

FIGS. 5*a* and 5*b* show a detailed plan view and side view of a stop plate of the bracket assembly in FIG. 3 respectively;

FIGS. 6*a* and 6*b* show a detailed plan view and side view of the locking portion in FIG. 1 respectively;

FIGS. 6*c*-6*e* illustrate a side view, rear view and end view respectively;

FIGS. 7*a*-7*c* illustrate a detailed plan view from above, cross sectional view and plan view from below of the support foot in FIG. 1 respectively;

FIG. 8 is a detailed cross sectional view of a distal end of the inner telescopic member shown in FIG. 1;

FIG. 9 is a cross sectional view of a further embodiment of the present invention; and FIGS. 10a-10c illustrate the steps involved in actuating a handle portion of the support post in one embodiment of the present invention.

Referring to FIGS. 1-2, there is illustrated a support post 2 for locating between a floor and a ceiling of a building on a construction site. A safety fence assembly (not shown) is fitted to the support post in use. Any conventional safety fence can be used as required.

The support post 2 includes a first outer telescopic member 4 and a second inner telescopic member 6. Both members 4, 6 are substantially elongate in form, are hollow and have a generally quadrilateral or square shaped cross section so as to allow inner member 6 to be slidably movable within outer member 4 longitudinally of post 2 but to prevent relative rotation of members 4, 6. Outer member 4 has slightly larger dimensions than inner member 6 to allow inner member 6 to be slidably movable in outer member 4.

Outer member 4 has a support foot 8 joined to a distal end 10 thereof via an attachment shaft 12. In this embodiment shaft 12 is welded to outer member 4 and foot 8 is freely rotatable on shaft 12.

Inner member 6 has a support foot 14 joined to a distal end 16 thereof via resilient biasing means 18 as described in more detail below.

Support foot 8 of outer member 4 is typically located on a floor on a level of the building being constructed and support foot 14 of inner member 6 is typically moved into engagement with the ceiling directly above the floor on which foot 8 is located. The inner member 6 is telescoped a required distance relative to outer member 4 to allow the height of the post to be adjusted to fit between the floor and ceiling. When the post is correctly positioned, the longitudinal axis of the support post is typically substantially vertical in orientation.

Locking means 20 are provided for locking inner member 6 relative to outer member 4 in the required position. More particularly, locking means 20 includes actuating means in the form of a bracket assembly 22 and an actuating handle 24, and a locking portion 26 which is movable by the actuating handle 24 from a first unlocked position to a second locked position, as will be described in more detail below. The handle 24 is shown in solid black lines at an acute angle to the outer member 4 in the first unlocked position and is shown in dotted black lines substantially parallel with and adjacent to the outer member 4 in the second locked position. A further safety lock 28 is provided which secures handle 24 in the second locked position and is releasable therefrom with the handle 24 in the first unlocked position. The locked and unlocked positions of safety lock 28 are shown using different dotted lines in FIG. 1.

Referring to FIG. 3, there is illustrated a more detailed view of bracket assembly 22 fixed to outer telescopic member 4. Two upright arms 30, 30' are located on the rear of assembly 22 and a single upright arm 32 is located on the front of assembly 22. First ends of upright arms 30, 30', 32 engage with member 4 and the opposite ends support a stop plate 34 a pre-determined spaced distance above end 36 of outer member 4. Stop plate 34 has a quadrilateral or square shaped aperture 38 defined therethrough to allow inner member 6 to be slidably moved therethrough in use. A more detailed view of stop plate 34 is shown in FIGS. 5a and 5b. Recess 33 is defined in front edge 35 of plate 24 for the location of upright arm 32 therein and recesses 37 are defined in rear edge 39 for the location of upright arms 30, 30' respectively.

Handle 24 includes an elongate arm portion 40 having a head portion 42 for engaging locking portion 26 at an end 44 thereof, as shown in FIGS. 6c-6e. End 44 is pivotally mounted between upright arms 30, 30' on bracket assembly 22 via a shaft 46 located between apertures 48 defined in arms 30, 30'. Locking portion 26 can be pivoted between the locked and unlocked positions by moving arm portion 40.

Locking portion 26 is in the form of a plate, similar in appearance to stop plate 34, having a quadrilateral or square shaped aperture 50 defined therethrough to allow locking plate 26 to be slidably movable longitudinally of inner telescopic member 6, as shown in FIGS. 6a-6b. More particularly, locking plate 26 is located between end 36 of outer telescopic member 4 and stop plate 34 in use. A recess 52 is defined in a front edge 54 of locking plate 26 to allow said locking plate to be slidably located with upright arm 32 of bracket assembly 22. An engaging area 56 is located adjacent the rear of plate 34 to allow head portion 42 of the handle 24 to engage therewith in use. In this example, aperture 50 is off centered towards front edge 54 to allow a greater surface area to be provided for area 56.

With handle 24 in an unlocked position, head portion 42 does not engage or applies very little engaging force to engaging area 56 of locking portion 26. Locking portion 26 can therefore move freely along the external surface of inner telescopic member 6 between stop plate 34 and end 36 of outer telescopic member 4 and is typically substantially transversely positioned relative to inner member 6. In addition, inner telescopic member 6 can slidably move in outer telescopic member 4.

In order to move handle 24 to a locked position, a user moves arm portion 40 from an outwardly protruding position where the arm portion 40 makes an acute angle with outer telescopic member, 4 to a position wherein the arm portion 40 is substantially adjacent to and parallel with member 4. This movement causes head portion 42 of handle 24 to force locking plate 26 towards stop plate 34. In addition, since the force is applied to engaging area 56 on one side of plate 26 only, this causes locking plate 26 to move at an acute angle to inner telescopic member 6, with rear edge 58 closer to stop plate 34 than front edge 54. This in turn causes inner front edge 60 of aperture 50 to engage with a front surface of inner telescopic member 6 and inner rear edge 62 of aperture 50 to engage with a rear surface of member 6, thereby preventing further movement of the locking plate 26 and thus preventing movement of inner telescopic member 6 relative to outer telescopic member 4. To aid this kicking mechanism, the inner edges of aperture 50 are left rough or are provided with additional engagement means, such as teeth, to increase the level of engagement of the same with the outer surface of telescopic member 6 in the second locked position. In addition, head portion 42 of handle 24 is provided with a cam or curved surface to allow pivoting of head portion 42 against locking plate 26.

Safety lock 28 is then applied to handle 24 to lock the handle in the locked position. If the safety lock 28 is not applied, handle 24 simply swings back to the outwardly protruding position and does not allow locking of inner telescopic member relative to outer telescopic member. The safety lock 28 in this example is in the form of an annular shaped member, as shown in FIGS. 4a-4b, which is pivotably attached to outer telescopic member via a sneck 64. It engages in a recess 66 defined in arm portion 40 of handle 24 to lock the arm portion in place.

The support foot 8 typically includes a body portion 68 with a plurality of protruding engaging portions 70 depending from the body portion and protruding outwardly from the telescopic member 4 to which the support foot is attached, as shown in FIGS. 7a-7c. Engaging portions 70 engage with a floor in use.

The support foot 14 is similar in appearance to support foot 8 but includes resilient biasing means 18, as shown in more detail in FIG. 8. More particularly, resilient biasing means 18 includes an arbour or shaft 72 located substantially perpendicularly to body portion 68, a pressure plate 74 and a plurality of disc springs or Belleville Washers 76 located in a stack between plate 74 and shaft 72. Disc springs are typically conical shaped washers and in this embodiment are designed to be loaded in an axial direction longitudinally of post 2. They can be statically loaded but in this example they are dynamically loaded to apply a resilient biasing force against foot 14 when post 2 is moved into position between a floor and ceiling, thereby engaging foot 14 firmly against a ceiling surface. The number of washers 76 provided in the stack determines the level of biasing force applied to foot 14 in use. A neck portion 78, defined at end 80 of shaft 72, and end surface 82 of pressure plate 74 are located in the cavity of inner telescopic member 6 via U-shaped cut out tab portions 84, 86 which are folded inwardly of said cavity.

A further embodiment of the present invention is shown in FIG. 9 wherein the support post 102 is used to attach safety fences thereto, particularly but not necessarily exclusively when there is no upper ceiling to the floor level requiring safety fencing/support. As such, post 102 is attached to the ceiling 106 of the floor level below and a further elongate post member 122 is attached to the upper floor.

Support post 102 includes outer and inner telescopic members 108, 110 as previously described above but, in contrast to the above described embodiment, the distal end 112 of the outer or lower telescopic member does not engage directly with a floor surface. Instead, a C-shaped structure 114 protrudes outwardly from outer member 4. More particularly, C-shaped structure 114 includes an elongate arm portion 118 extending between the upper level floor 104 and lower level ceiling 106 (which can also be a concrete slab, girder, steel column and/or the like) with a spacing member 116 joining a lower end of arm portion 118 to outer telescopic member 110 and a spacing member 120 joining an upper end of arm portion 118 to an additional elongate post member 122.

The elongate post member 122 can be similar in form to outer telescopic member 4, 110 with a support foot 8 for engaging upper floor surface 104. Post member 122 can be hollow to allow a further inner telescopic member to be slidably located in end 124 or can be substantially solid in form. The safety fence is typically fitted to post member 122.

In use, the locking means 20 is actuated in a similar manner to that described for the first embodiment to create sufficient tension between support foot 14 engaging with the ceiling 106 on the level below floor 104 and foot 8 engaging with floor 104.

The C shaped structure 114 can be fixed to or integral with a telescopic member or post member 122. Alternatively, structure 114 can be detachably attached.

The device of the present invention can be formed from any suitable material and can be any suitable size and/or shape. In a preferred embodiment the device is formed from steel and further preferably galvanised steel.

Referring to FIGS. 10a-10c, there is illustrated a method of using a handle arrangement 202 of a support post 2 according to a further embodiment of the present invention.

The handle arrangement 202 includes a first handle portion 204 and a second handle portion 206 slidably mounted thereon. More particularly, the first handle portion 204 is in the form of an elongate member having a safety recess 208 defined adjacent a free end 210 thereof. The safety recess 208 allows engagement with a safety lock 28 therewith in use. Movement of first handle portion 204 relative to support post 2 is as previously described above.

The second handle portion 206 is in the form of a sleeve having slightly larger dimensions than the first handle portion 204 to allow free movement of portion 206 relative to portion 204. Second handle portion 206 is movable between a first position, as shown in FIG. 10b, wherein portion 206 is a spaced distance apart from safety recess 208 and adjacent an upper part of first handle portion 204, and a second position, as shown in FIGS. 10a and 10c, wherein portion 206 is located adjacent a lower part of first handle portion 204. A recess 212 is defined at end 214 of second handle portion 206 to allow at least part of the safety lock 28 to pass through the second handle portion and be located in the safety recess 208 when handle portion 206 is in the second position. Recess 212 is typically substantially aligned with safety recess 208 in the second position.

The safety lock 28 functions as previously described above and can be pivotally moved into engagement with safety recess 208 on first handle portion 204 and released therefrom. At least one aperture 216 is defined in the side wall of second handle portion 206 to allow a locking bolt (not shown) or padlock to pass therethrough to maintain the second handle portion in the second position in use. With the second handle portion 206 locked in the second position, safety lock 28 cannot be released from safety recess 208.

The invention claimed is:

1. A support device, said support device including at least first and second members telescopically arranged together, each of said members having a distal end engaging directly or indirectly with a suitable surface in use, and locking means being provided on said first and second members to lock the members in a required relative position in use, and wherein the locking means includes a locking portion movably mounted on said second member and actuating means, said actuating means moving said locking portion between a first unlocked position, wherein said locking portion is movable relative to the first and second members, and a second locked position, wherein said locking portion engages with the second member to lock the members in said required relative position, and wherein
the actuating means includes a bracket assembly and actuating handle portion with said actuating handle portion movably mounted to said bracket assembly, the actuating handle portion has a head portion with a curved surface which pivotably engages against the locking portion to provide the second locked position, and with the head portion either not engaging the locking portion when in the first unlocked portion or if engaging the locking portion being unattached therewith when in the first unlocked portion providing insufficient engaging force to move the locking portion to the second locked position.

2. A support device according to claim 1 wherein the locking portion is slidably movable longitudinally of the first and second members of the first unlocked position.

3. A support device according to claim 1 wherein the locking portion has an aperture or recess defined therein and the second member is located in or through said aperture or recess and is movable relative thereto.

4. A support device according to claim 1 wherein the locking portion is in the form of a plate component with an aperture or recess defined therethrough.

5. A support device according to claim 1 wherein one or more inner edges or walls of the locking portion defining the aperture or recess are moved into engagement with the second member in the second locked position.

6. A support device according to claim 1 wherein at least part of the actuating means is attached to the first member.

7. A support device according to claim 1 wherein the actuating means is attached to an outer or lower telescopic member of the first and second members and the locking portion is movable mounted on an inner or upper telescopic member of the first and second members.

8. A support device according to claim 1 wherein the actuating handle portion is arranged to move the locking portion from a position where it is substantially transverse to the first member on which it is mounted in the first unlocked position, to an acute angle to said first member in the second locked position.

9. A support device according to claim 8 wherein the actuating handle portion includes a cam or curved surface to move the locking portion to an angled second position.

10. A support device according to claim 1 wherein the bracket assembly includes stop means to limit movement of the locking portion relative thereto.

11. A support device according to claim 10 wherein the stop means includes a plate like member with an aperture defined therethrough which, in the first unlocked position, allows the second member to be movable therethrough but prevents movement of the locking portion therethrough.

12. A support device according to claim 10 wherein the stop means limits movement of the locking portion in one direction and the end of the first member to which the bracket assembly is joined limits movement of the locking portion in the opposite direction.

13. A support device according to claim 1 wherein the locking portion includes at least one recess which is movably mounted on at least part of the actuation means to guide movement of the locking portion relative to the actuation means.

14. A support device according to claim 1 wherein a further safety lock is provided to lock the actuating means in the second locked position in use.

15. A support device according to claim 14 wherein the further safety lock is in the form of a lever or annular member which is moved into engagement with a handle portion of the actuating means to lock the handle portion against the first member.

16. A support device according to claim 15 wherein the lever or annular member is pivotally mounted on the first member.

17. A support device according to claim 1 wherein the actuating means includes a handle portion having at least first and second parts, the second part movable relative to the first part.

18. A support device according to claim 17 wherein the second part is in the form of a sleeve and is slidably movable over said first part.

19. A support device, said support device including at least first and second members telescopically arranged together, each of said members having a distal end engaging directly or indirectly with a suitable surface in use, and locking means being provided on said first and second members to lock the members in a required relative position in use, and wherein the locking means includes a locking portion movably mounted on said second member and actuating means, said actuating means moving said locking portion between a first unlocked position, wherein said locking portion is movable relative to the first and second members, and a second locked position, wherein said locking portion engages with the second member to lock the members in said required relative position and, wherein the actuating means includes a handle portion having at least first and second parts, the second part movable relative to the first part, wherein the second part is movable between a first position, wherein the second part is a spaced distance apart from a safety recess or engagement portion provided on the first part to allow a safety lock to be engaged with and released from said safety recess or engagement portion, and a second portion, wherein the second part is located over at least part of the safety recess or engagement portion to prevent engagement or release of a safety lock.

20. A support device according to claim 19 wherein one or more apertures or recesses are provided to allow a locking bolt or padlock to be located therethrough to maintain the second part in the second position.

21. A support device according to claim 1 wherein a support foot is provided at the distal ends of the first and second members to engage with one or more suitable surfaces in use.

22. A support device according to claim 21 wherein one or more engaging means are associated with the support foot to increase engagement between the support foot and the surfaces.

23. A support device according to claim 22 wherein the engaging means includes any or any combination of one or more protruding spikes, teeth or gripping members.

24. A support device according to claim 21 wherein resilient biasing means are provided for biasing the support foot outwardly of the second member.

25. A support device according to claim 24 wherein one or more protruding tabs are provided internally of the second member to maintain the resilient biasing means in place in said members.

26. A support device according to claim 24 wherein the resilient biasing means includes one or more disc springs.

27. A support device according to claim 26 wherein a plurality of disc springs are provided in a stack substantially longitudinally of the device.

28. A support device according to claim 1 wherein a further support member is associated with the support device, the further support member having a distal end engaging directly or indirectly with a suitable surface in use.

29. A support device according to claim 28 wherein the further support member is in the form of an elongate post and a linkage assembly links the further support member to the first and second members.

30. A support device according to claim 29 wherein the linkage assembly is arranged so as to position the further support member a spaced distance apart from the first and second members and substantially aligned with the longitudinal axis thereof.

31. A support device, said support device including at least first and second members telescopically arranged together, each of said members having a distal end engaging directly or indirectly with a suitable surface in use, and locking means being provided on said first and second members to lock the members in a required relative position in use, and wherein the locking means includes a locking portion movably mounted on said second member and actuating means, said actuating means moving said locking portion between a first unlocked position, wherein said locking portion is movable relative to the first and second members, and a second locked position, wherein said locking portion engages with the second member to lock the members in said required relative position, wherein wherein a further support member is associated with the support device, the further support member having a distal end engaging directly or indirectly with a suitable surface in use, and wherein the further support member is in the form of an elongate post and a linkage assembly links the further support member to the first and second members, and wherein the linkage assembly is arranged so as to position the further support member a spaced distance apart from the first and second members and substantially aligned with the longitudinal axis thereof, and wherein the linkage assembly is a substantially C-shaped or G-shaped linkage.

32. A support device, said support device including at least first and second members, the distal end or ends of said members engaging directly or indirectly with a suitable surface in use, said members movable between a first unlocked position and a second locked position, and locking means being provided between said first and second members to lock the members in the second locked position, and wherein a further support member is associated with the support device, the further support member having a distal end engaging directly or indirectly with a suitable surface in use; and wherein:

the locking means includes a locking portion and actuating means, the actuating means includes a bracket assembly and actuating handle portion with said actuating handle portion movably mounted to said bracket assembly, the actuating handle portion has a head portion with a curved surface which is pivotably movable against the locking portion to provide the second locked position, the head portion being unattached with the locking portion of if attached thereto providing insufficient locking force to the locking portion when in the first unlocked portion.

* * * * *